(12) United States Patent
Varoglu

(10) Patent No.: US 10,698,118 B1
(45) Date of Patent: Jun. 30, 2020

(54) SENSOR-ASSISTED LOCATION FIX

(71) Applicant: Apple Inc., Cupertino, CA (US)

(72) Inventor: Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 15/611,513

(22) Filed: Jun. 1, 2017

Related U.S. Application Data

(60) Continuation of application No. 15/469,349, filed on Mar. 24, 2017, now abandoned, which is a division of application No. 13/772,978, filed on Feb. 21, 2013, now Pat. No. 9,606,241.

(51) Int. Cl.
*G01S 19/48* (2010.01)

(52) U.S. Cl.
CPC .................... *G01S 19/48* (2013.01)

(58) Field of Classification Search
CPC .......... G01S 19/09; G01S 19/45; G01S 19/48; G01S 19/49
USPC .................................................... 342/357.28
See application file for complete search history.

(56) References Cited

U.S. PATENT DOCUMENTS

| | | | |
|---|---|---|---|
| 5,416,712 A | 5/1995 | Geier et al. | |
| 5,448,773 A | 9/1995 | McBurney et al. | |
| 6,405,125 B1 | 6/2002 | Ayed | |
| 6,407,698 B1 | 6/2002 | Ayed | |
| 6,429,791 B2 | 8/2002 | Quinn | |
| 6,871,139 B2 | 3/2005 | Liu et al. | |
| 6,909,964 B2 | 6/2005 | Armstrong et al. | |
| 7,359,718 B2 | 4/2008 | Tao et al. | |
| 7,369,061 B1 | 5/2008 | Sellers et al. | |
| 7,688,226 B2 | 3/2010 | McCall | |
| 7,756,529 B2 | 7/2010 | Hashimoto et al. | |
| 7,965,881 B2 | 6/2011 | Reese et al. | |

(Continued)

FOREIGN PATENT DOCUMENTS

EP 1332336 10/2012

OTHER PUBLICATIONS

U.S. Appl. No. 13/772,978 , "Final Office Action", dated Jul. 28, 2016, 4 pages.

(Continued)

*Primary Examiner* — Dao L Phan
(74) *Attorney, Agent, or Firm* — Kilpatrick Townsend & Stockton LLP

(57) ABSTRACT

Sensor-assisted location technology is disclosed. Primary location technologies, such as GPS, can be used to determine the current location (e.g., a location fix) of a location-enabled device. In some instances, the primary location technology may be unreliable and/or consume more power than an alternative location technology. Sensors, such as accelerometers, compasses, gyrometers, and the like, can be used to supplement and/or increase the accuracy of location data. For example, a location-enabled device can identify an area with unreliable GPS location data and use sensors to calculate a more accurate location. Areas identified may be crowd-sourced. Sensors can be used to identify errors in the location data provided by primary location technology. Sensors can be used to modify a sampling interval of the primary location technology. Sensor can be used to smooth motion on a user interface between sampling intervals of the primary location technology.

22 Claims, 9 Drawing Sheets

(56) References Cited

U.S. PATENT DOCUMENTS

| | | | |
|---|---|---|---|
| 8,010,101 B2 | 8/2011 | Bugenhagen | |
| 8,095,146 B2 | 1/2012 | Raghavachari | |
| 8,103,441 B2 | 1/2012 | Callaghan et al. | |
| 8,112,251 B2 | 2/2012 | Case, Jr. et al. | |
| 8,164,599 B1 | 4/2012 | Kadous et al. | |
| 8,467,768 B2 | 6/2013 | Mahaffey et al. | |
| 8,560,237 B2 | 10/2013 | Rudow et al. | |
| 8,694,245 B2 | 4/2014 | Zubas et al. | |
| 8,918,103 B2 | 12/2014 | Mayor et al. | |
| 9,121,922 B2 | 9/2015 | Jarvis et al. | |
| 9,143,892 B2 | 9/2015 | Kuehnel et al. | |
| 9,222,787 B2 | 12/2015 | Blumenberg et al. | |
| 9,591,608 B2 | 3/2017 | Lopes et al. | |
| 9,606,241 B2 * | 3/2017 | Varoglu | G01S 19/48 |
| 2006/0089793 A1 | 4/2006 | Rudow et al. | |
| 2006/0267799 A1 | 11/2006 | Mendelson | |
| 2007/0126603 A1 | 6/2007 | Driscoll et al. | |
| 2008/0004037 A1 | 1/2008 | Achlioptas et al. | |
| 2008/0132249 A1 | 6/2008 | Hamilton | |
| 2009/0177383 A1 | 7/2009 | Tertoolen | |
| 2009/0216442 A1 | 8/2009 | Luert | |
| 2009/0326810 A1 | 12/2009 | Callaghan et al. | |
| 2011/0032105 A1 | 2/2011 | Hoffman et al. | |
| 2011/0071759 A1 | 3/2011 | Pande et al. | |
| 2011/0167128 A1 | 7/2011 | Raghunathan et al. | |
| 2011/0269476 A1 | 11/2011 | Kumar | |
| 2011/0285591 A1 | 11/2011 | Wong et al. | |
| 2012/0143499 A1 | 6/2012 | Petersen | |
| 2012/0197588 A1 | 8/2012 | Lee et al. | |
| 2012/0315918 A1 | 12/2012 | Kadous | |
| 2013/0035110 A1 | 2/2013 | Sridhara et al. | |
| 2013/0044957 A1 | 2/2013 | Khorashadi et al. | |
| 2013/0099892 A1 | 4/2013 | Tucker et al. | |
| 2013/0103200 A1 | 4/2013 | Tucker et al. | |
| 2013/0122935 A1 | 5/2013 | Das et al. | |
| 2013/0143590 A1 | 6/2013 | Sridhara et al. | |
| 2014/0232569 A1 | 8/2014 | Skinder et al. | |
| 2014/0232570 A1 | 8/2014 | Skinder et al. | |
| 2014/0232593 A1 | 8/2014 | Varoglu | |
| 2016/0100290 A1 | 4/2016 | Smith | |
| 2016/0272196 A1 | 9/2016 | Hocking et al. | |
| 2017/0059326 A1 | 3/2017 | Zhang | |

OTHER PUBLICATIONS

U.S. Appl. No. 13/772,978, "Non-Final Office Action", dated Feb. 1, 2016, 4 pages.

U.S. Appl. No. 13/772,978, "Notice of Allowance", dated Nov. 23, 2016, 7 pages.

U.S. Appl. No. 13/772,978, "Restriction Requirement", dated Nov. 4, 2015, 6 pages.

Gao et al., "Collaborative Location Certification for Sensor Networks", ACM Transactions on Sensor Networks (TOSN) 6.4 (2010): 30. Located via Google Scholar, free copy available at http://citeseerx.ist.psu.edu/viewdoc/download?doi=10.1.1.149.9825&rep=rep1&type=pdf, 2010, 25 pages.

Kao, "Integration of GPS and dead-reckoning navigation systems", Vehicle Navigation and Information Systems Conference, 1991. vol. 2. IEEE, 1991, pp. 635-643.

Ojeda et al., "Non-GPS navigation with the personal dead-reckoning system", Defense and Security Symposium. International Society for Optics and Photonics, Located via Google Scholar, free copy available at http://www-personal.umich.edu/~johannb/Papers/paper130.pdf, 2007, 11 pages.

Weber et al., "Mobile Map Browsers: Anticipated User Interaction for Data Pre-Fetching", University of Maine, Dec. 2010, 113 pages.

* cited by examiner

SENSOR-ASSISTED LOCATION FIX

CROSS-REFERENCE TO RELATED APPLICATIONS

This application is a continuation of U.S. patent application Ser. No. 15/469,349 filed Mar. 24, 2017, which is a divisional of U.S. patent application Ser. No. 13/772,978, filed Feb. 21, 2013, now U.S. Pat. No. 9,606,241, the disclosures of which are hereby incorporated by reference in their entirety.

BACKGROUND

The present disclosure generally relates to determining a sensor-assisted location fix, and more specifically to determining a location fix using a location technology supplemented by sensor data.

Mobile computing devices, such as smart phones, tablet computers, media players, and the like, have become ubiquitous. People are ever more reliant on mobile devices for their day-to-day activities. Mobile devices often have the ability to determine the location of the device. This ability has allowed mobile devices to be used for navigation and other location services. Vehicles are also increasingly equipped with navigation and other computer systems that may be connected with various sensors and inputs. Mobile devices and vehicles can exchange information and communicate in wired and wireless fashion.

More accurately determining location can lead to more useful applications of the technology. However, in some circumstances primary location technologies become inaccurate or unavailable. For example, determining location can be difficult in "urban canyons" or "building shadows." Certain location technologies use a relatively high amount of power, which can limit battery life.

Embodiments of the invention address this and other problems both individually and collectively.

SUMMARY

Sensor-assisted location technology is disclosed. Primary location technologies, such as GPS, can be used to determine the current location (e.g., a location fix) of a location-enabled device. In some instances, the primary location technology may be unreliable and/or consume more power than an alternative location technology. Sensors, such as accelerometers, compasses, gyrometers, and the like, can be used to supplement and/or increase the accuracy of location data. For example, a location-enabled device can identify an area with unreliable GPS location data and use sensors to calculate a more accurate location. Areas identified may be crowd-sourced. Sensors can be used to identify errors in the location data provided by primary location technology. Sensors can be used to modify a sampling interval of the primary location technology. Sensors can be used to smooth motion on a user interface between sampling intervals of the primary location technology.

Other embodiments are directed to systems, mobile devices, and computer-readable media associated with methods described herein. A better understanding of the nature and advantages of the present invention may be gained with reference to the following detailed description and the accompanying drawings.

DETAILED DESCRIPTION

Figure 1:
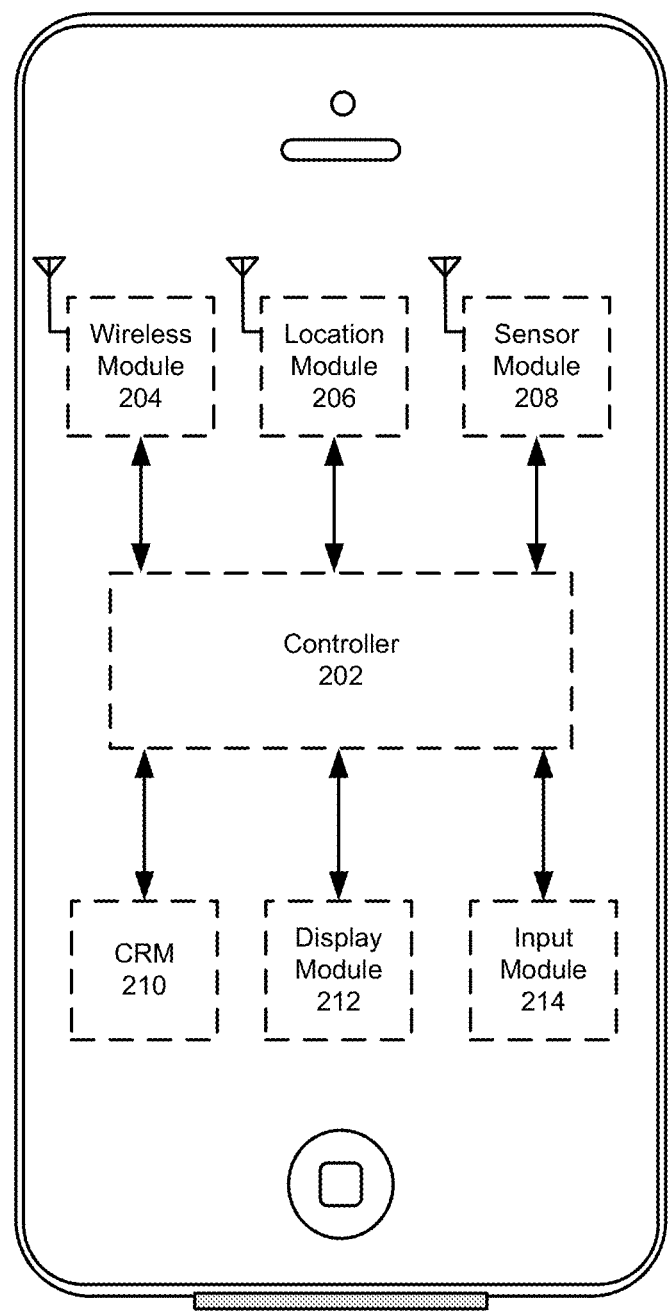
FIG. 1 is a block diagram of a mobile device according to an embodiment of the present invention.

Sensors, such as accelerometers, compasses, and gyrometers, can be used to enhance the location fix of a GPS-enabled device. Primary location technologies, such as GPS, can be used to determine the current location (e.g., a location fix) of a location-enabled device. In some instances, the primary location technology may be unreliable, not as accurate as a particular location services demands, and/or consume more power than an alternative location technology. Sensors, such as accelerometers, compasses, gyrometers, and the like, can be used to supplement and/or increase the accuracy of location data.

In one example, a location-enabled device uses GPS as its primary location technology. The location-enabled device can identify an area with unreliable GPS location data (e.g., by recognizing that it is approaching a known "urban canyon" or by other suitable means). Once identified, the location-enabled device can switch into an estimation mode. The estimation mode relies on sensor data representing a change in positions (e.g., a relative distance traveled and a relative direction traveled from a last known trusted location). Sensor data is combined with primary location data to calculate a more accurate location than is available from the primary location data alone. When the device detects an exit from the area with unreliable GPS location data, the location-enabled device can return to a standard mode of operation.

In another example, the accuracy of the primary location technology (e.g., GPS) can be cross-checked against a location fix calculated using a relative distance traveled and a relative direction traveled from a last known trusted location. When errors are detected (or not detected), the mode of operation of the device can be changed (e.g., the location-enabled device could switch to estimation mode when errors are detected, the sampling interval of the primary location technology can be modified, etc.).

In another example, the sampling interval of the primary location technology (e.g., GPS) can be changed based on a detection of a status change by sensors. For example, GPS may poll location every 5 seconds in a first mode of operating. A status change event can be a sharp (e.g., approximately 90 degree) turn detected by sensors of the location-enabled device. Responsive to the status change, the location-enabled device could poll GPS location at an increased rate (e.g., every 1 second). In this manner, the GPS is being polled more frequently when more significant position changes likely to occur and less frequently when it is less likely that a significant position change is occurring. In this manner, a user interface can more accurately display the real-time position of the location-enabled device during a turn. In another example, sensor data can be used to provide a location estimate between GPS sampling intervals. This can further be used to increase the accuracy of a real-time display of current location.

In another example, areas identified as having unreliable GPS can be recorded in a data set. Areas identified may be crowd-sourced. The data set may be anonymized and sent to a remote server computer to analyze the data for statistical significance. A map or database of areas with unreliable GPS data can be generated and populated. This data may later be used in identifying when a location-enabled device approaches an area with unreliable location signals.

These and other embodiments will be described below.

I. Mobile Device and Vehicle Systems

Figure 2:
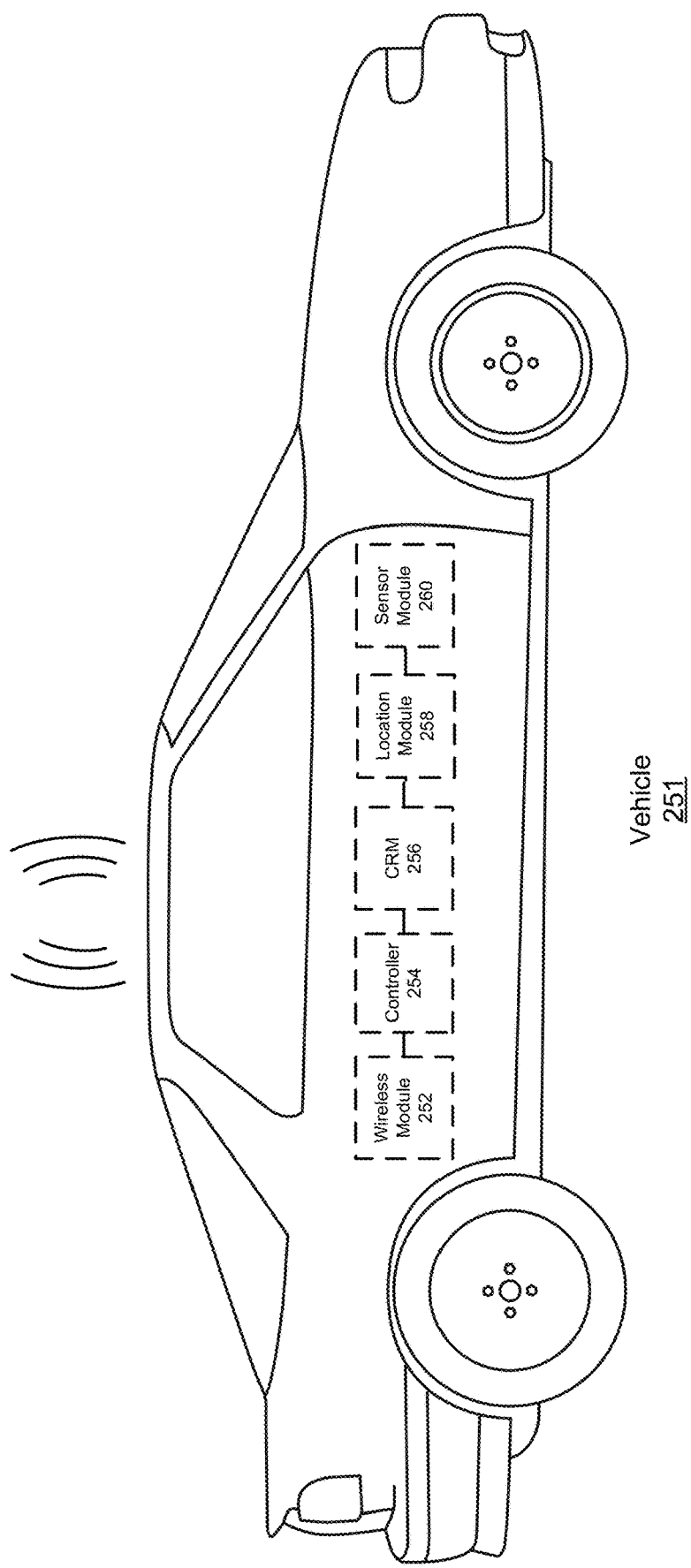
FIG. 2 is a block diagram of a vehicle according to an embodiment of the present invention.

FIG. 1 shows a high-level block diagram of a mobile device 201. It will be further appreciated that the device shown in FIG. 2 is illustrative and that variations and modifications are possible. Mobile device 201 can include a controller 202, a wireless module 204, a location module 206, a sensor module 208, a computer-readable medium (CRM) 210, a display module 212, and an input module 214. Mobile device 201 can include additional modules. In some embodiments, mobile device 201 can be a sufficient size, dimension, and weight to enable the device to be easily moved by a user. For example, mobile device 201 can be pocket size.

Controller 202, which can be implemented as one or more integrated circuits, can control and manage the overall operation of mobile device 201. For example, controller 202 can perform various tasks, such as retrieving various assets that can be stored in CRM 210, accessing the functionalities of various modules (e.g., interacting with other Bluetooth enabled devices via Bluetooth module), executing various software programs (e.g., operating systems and applications) residing on CRM 210, and so on. In some embodiments, controller 202 can include one or more processors (e.g., microprocessors or microcontrollers) configured to execute machine-readable instructions. For example, controller 202 can include a single chip applications processor. Controller 202 can further be connected to CRM 210 in any suitable manner.

Wireless module 204 can include any suitable wireless communication technology. For example, wireless module 204 could include a Bluetooth module, a radio frequency (RF) module, a WiFi module, and/or the like. The Bluetooth module can include any suitable combinations of hardware for performing wireless communications with other Bluetooth-enabled devices and allows an RF signal to be exchanged between controller 202 and other Bluetooth-enabled devices. In some embodiments, a Bluetooth module can perform such wireless communications according to Bluetooth Basic Rate/Enhanced Data Rate (BR/EDR) and/or Bluetooth Low Energy (LE) standards. The Bluetooth protocol, in general, enables point-to-point wireless communications between multiple devices over short distances (e.g., 30 meters). Bluetooth has gained widespread popularity since its introduction and is currently used in a range of different devices. In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. Devices using Bluetooth LE can often operate for more than a year without requiring their batteries to be recharged.

For example, a Bluetooth module can include suitable hardware for performing device discovery, connection establishment, and communication based on only Bluetooth LE (e.g., single mode operation). As another example, a Bluetooth module can include suitable hardware for device discovery, connection establishment, and communication based on both Bluetooth BR/EDR and Bluetooth LE (e.g., dual mode operation). As still another example, a Bluetooth module can include suitable hardware for device discovery, connection establishment, and communication based only on Bluetooth BR/EDR.

An RF module can include any suitable combinations of hardware for performing wireless communications with wireless voice and/or data networks. For example, an RF module can include an RF transceiver that enables a user of mobile device 201 to place telephone calls over a wireless voice network.

A WiFi module can include any suitable combinations of hardware for performing WiFi-based communications with other WiFi-enabled devices. For example, WiFi module may be compatible with IEEE 802.11a, IEEE 802.11b, IEEE 802.11g and/or IEEE 802.11n.

Location module 206 can include any suitable location technology using one or more wireless signals to determine a current location. In some embodiments, location module 206 includes a global positioning system (GPS) module. In some embodiments, location module 206 includes one or more of the following: WiFi location module, cellular location module, crowd-sourced WiFi location module, time of flight calculations (ToF) location module, and the like. However, in some circumstances, these location technologies may not be available or accurate. In some embodiments, the location data provided by a location technology may be supplemented with sensor data.

Sensor module 208 can include any suitable sensor for measuring and calculating a relative distance and direction traveled. Sensor module 208 can include one or more of the following accelerometers, compasses, gyroscopes, and/or other sensors for measuring motion, distance, or direction.

CRM 210 can be implemented, e.g., using disk, flash memory, random access memory (RAM), hybrid types of memory, optical disc drives or any other storage medium that can store program code and/or data. CRM 210 can store software programs that are executable by controller 202, including operating systems, applications, and related program code.

Software programs (also referred to as software or apps herein) can include any program executable by controller 202. In some embodiments, certain software programs can be installed on mobile device 201 by its manufacturer, while other software programs can be installed by a user. Examples of software programs can include operating systems, navigation or other maps applications, locator applications, productivity applications, video game applications, personal information management applications, applications for playing media assets and/or navigating a media asset database, applications for controlling a telephone interface to place and/or receive calls, and so on. For example, software programs can include an application that enables a user of mobile device 201 to activate and control vehicle 106. Certain software programs can provide communication with and/or control of mobile devices, and certain software programs can be responsive to control signals or other input from mobile device 201.

Display module 212 can be implemented using any suitable display technology, including a CRT display, an LCD display (e.g., touch screen), a plasma display, a direct-projection or rear-projection DLP, a microdisplay, and/or the like. In various embodiments, display module 212 can be used to visually display user interfaces, images, and/or the like.

Input module 214 can be implemented as a touch screen (e.g., LCD-based touch screen), a voice command system, a keyboard, a computer mouse, a trackball, a wireless remote, a button, and/or the like. Input module 214 can allow a user to provide inputs to invoke the functionality of controller 202. In some embodiments, input module 214 and display module 212 can be combined or integrated. For example, mobile device 201 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

FIG. 2 illustrates a vehicle 251 that can include wireless module 252, controller 254, CRM 256, location module 258, and sensor module 260. These modules can employ any suitable technology, including those described with respect to the modules shown in FIG. 1. The wireless module 252 can allow vehicle 251 to communicate with one or more computing devices (e.g., a mobile device 201). Any suitable information can be transmitted from the vehicle systems to external mobile devices, and vice versa.

Controller 254, which can be implemented as one or more integrated circuits, can control and manage certain operations of vehicle 251. For example, controller 254 can perform various tasks, such as accessing the functionalities of various modules (e.g., interacting with other Bluetooth enabled devices via Bluetooth module 252), executing various software programs residing on CRM 256, executing various vehicle-related operations and so on. In some embodiments, controller 254 can include one or more processors (e.g., microprocessors or microcontrollers) configured to execute machine-readable instructions. Controller 254 can further be connected to CRM 256 in any suitable manner.

CRM 256 can be implemented, e.g., using disk, flash memory, random access memory (RAM), hybrid types of memory, optical disc drives or any other storage medium that can store program code and/or data. CRM 256 can store program code that is executable by controller 254.

Location module 258 can include any suitable location technology using one or more wireless signals to determine a current location. In some embodiments, the location module can be part of a navigation unit of vehicle 251. In some embodiments, location module 258 includes a global positioning system (GPS) module. In some embodiments, location module 258 includes one or more of the following: WiFi location module, cellular location module, crowd-sourced WiFi location module, time of flight calculations (ToF) location module, and the like. However, in some circumstances, these location technologies may not be available or accurate. In some embodiments, the location data provided by the location technology may be supplemented with sensor data.

Sensor module 260 can include one or more of the following accelerometers, compasses, gyroscopes, and/or other sensors for measuring motion, distance, or direction of the movement of vehicle 251 (e.g., odometer, speedometer, etc.). Vehicle 251 may have additional modules that are not shown.

It will be appreciated that location-enabled devices mobile device 201 and vehicle 251, shown in FIGS. 1 and 2, are illustrative and that variations and modifications are possible. It is also appreciated that the mobile device 201 and vehicle 251 can communicate with each other (using wired or wireless connections) and collectively act as a "location-enabled device" according to some embodiments of the present invention. Further, while portable device 201 and vehicle 251 illustrated have been described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software.

II. GPS with Estimation Mode for Weak GPS Scenarios

Figure 3:
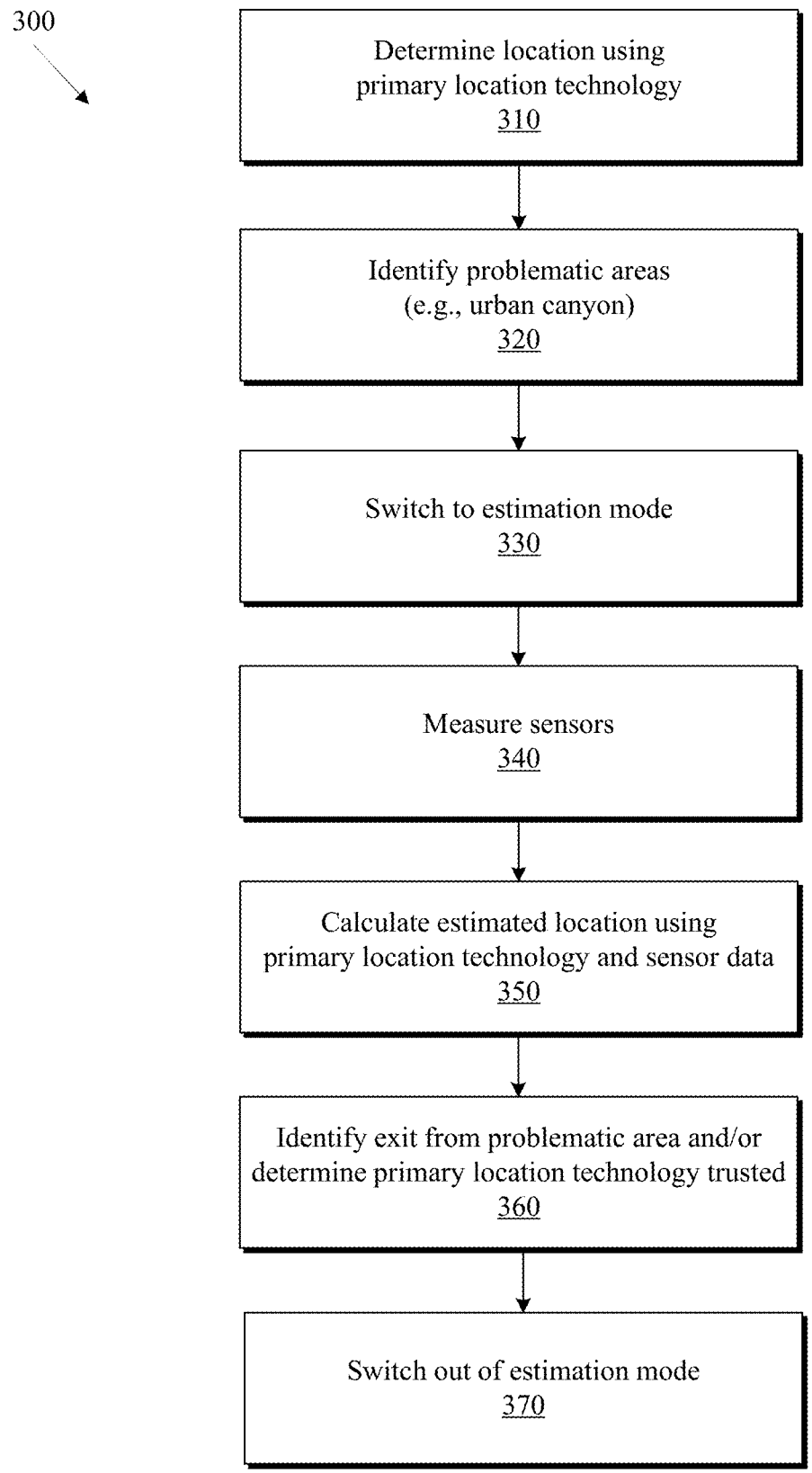
FIG. 3 is a flow diagram of a location estimation mode process according to an embodiment of the present invention.

FIG. 3 is a high-level flow diagram of a method 300 of enhancing location accuracy of a location-enabled device according to an embodiment of the present invention. A location-enabled device, such as a mobile device (e.g., 201) and/or vehicle (e.g., 251), may provide location services using a first location technology (e.g., GPS). In some embodiments, the first or primary location technology relies on wireless signals to determine the location of the location-enabled device. For example, GPS uses signals from satellites. Cellular and WiFi locations can rely on cellular and WiFi signals, respectively. In some circumstances, the primary location technology may be untrusted, unavailable or unreliable. For example, the location signals may be blocked by a structure, not within a line of sight, outside a working range, or otherwise compromised. In some embodiments, a problematic area can be identified and an estimation mode can be used to determine location more accurately. The estimation mode may use sensor data that measures and records data that can be used to calculate relative distances and direction traveled. Relative distance and direction may be measured by one or more sensors of the mobile device and/or the vehicle. Sensor data representative of a relative distance and direction traveled may supplement an absolute location determined by a primary location technology (e.g., latitude and longitude coordinates calculated by GPS).

At block 310, the location-enabled device can determine a location using a primary location technology. The primary location technology typically calculates location coordinates of the current location of the location-enabled device. For example, in some embodiments, the primary location technology can be GPS and the location coordinates can include latitude, longitude, and the like. In some embodiments, other location technologies can be used as the primary location technology. In addition to location coordinates, the primary location technology can also provide other location information and location accuracy information, including speed, bearing, altitude, location accuracy, altitude accuracy, time elapsed from last location update, distance traveled since last location update. In some embodiments, location-enabled devices may determine an updated location at a specified interval (e.g., once per second, once per 30 seconds, once per minute, etc.). In some embodiments, location may be updated continuously or periodically at varied intervals.

At block 320, the location-enabled device can identify a problematic area. A problematic area is an area where the primary location technology is unreliable, inaccurate, or otherwise untrusted. Problematic areas can be identified in a number of ways. In some embodiments, location information provided by the primary location technology may indicate a level of accuracy, reliability, or trustworthiness. For example, a GPS device may have a signal strength indicator. If the level is below a predetermined threshold, the location coordinates provided by the primary location technology at or around that time can be considered inaccurate, unreliable, and/or otherwise untrusted.

In some embodiments, the location-enabled device can determine that it is approaching or near a known problematic location. A database or other record can be maintained for known problematic areas. This database or record may be stored on the location-enabled device and/or in the cloud (e.g., in a remote server computer accessible by a wireless network). In some embodiments, this database or record can be pre-downloaded to the location-enabled device. In some embodiments, the area covered by the downloaded record or database can be any suitable size. For example, the area could be a 1 km square, 10 km square, 100 km square, etc.

In some embodiments, areas with unreliable location data can be identified by analyzing three dimensional images, aerial imagery, maps, and/or street views of the area. For example, a flyover view may be analyzed to identify urban canyons. That is, maps, images, and other views may be analyzed to determine whether structures, such as buildings in a dense downtown area, might obstruct GPS (or other location) signals.

In some embodiments, the location-enabled device may use sensor data to calibrate and/or determine how accurate the location data is from the primary location technology. That is, relative distance and direction traveled may be used to detect errors in the location data in the location provided by the primary location technology (e.g., GPS). For example, if a first GPS measurement and a second GPS measurement differ by 500$m$ and sensor data indicates that the device only moved 100$m$, the device may determine that the GPS location data is not accurate. Using sensor data to error-correct and provide a more accurate location fix is described in Section III.

Data populating the database of known problematic areas may be obtained through data harvesting. In some embodiments, problematic areas are harvested from a large number of mobile devices using a crowd-sourcing technique. Identifying problematic areas for a location technology is described in further detail in Section IV.

At block 330, the location-enabled device switches to estimation mode. Estimation mode can be any suitable mode that supplements the primary location technology with sensor data that provides a relative change in position and direction traveled.

At block 340, the location-enabled device can measure device sensors (and/or receive sensor data from another device). In some embodiments, a mobile device (e.g., 201) can record sensor data from sensors on the mobile device and/or a mobile device can receive sensor data from, for example, a vehicle (e.g., 251). The sensor data can be used to calculate a relative distance traveled. For example, an accelerometer can be used to calculate that the location-enabled device moved from Point A at to Point B in a certain time window. The sensor data can also be used to calculate a direction traveled to get from Point A to Point B during a certain time window (e.g., a bearing measured in degrees, a cardinal direction, etc.).

At block 350, a location can be estimated using the primary location technology and the relative distance traveled and the relative direction traveled, as measured by sensors on the location-enabled device (e.g., mobile device 201 and/or vehicle 251) at block 340. In some embodiments, the last known reliable location (e.g., a location that is trusted as accurate) can be combined with relative distance and direction traveled to arrive at a location estimate (in estimation mode). In some embodiments, the last known reliable location is the last location information update before the identification of a problematic area (e.g., before block 320). In some embodiments, sensor data is measured and stored before the identification a problematic area (e.g., before block 320) so that, when the problematic area is identified, a retrospective location estimation calculation can be made from the last known reliable location.

In some embodiments, raw untrusted primary location data (primary location data that is not supplemented by sensor data) may be disregarded and the location estimate can be determined based on the last trusted primary location data as supplemented with a relative change in distance and position as recorded by sensor data. This can be beneficial when there is a high degree of unreliability of the primary location signal, such as a location signal "deadzone" (e.g., area with very unreliable primary location signal, etc.). In some embodiments, raw untrusted primary location data may be weighted in proportion to the level of reliability. That is, in estimation mode, the location-enabled device may still rely on the (untrusted) primary location technology to a certain extent. For example, raw untrusted primary location data may be assigned a first predetermined weight and supplemented location data may be assigned second predetermined weight. The location estimate may be based on the weighted score of raw and supplemented untrusted primary location data. This can be beneficial where there is a certain degree of reliability to the primary location data, but the reliability is not sufficient to completely rely on the primary location technology.

At block 360, when the device leaves the problematic location, it can return to a standard mode of operation (e.g., determining location with the primary location technology without supplementation from sensor data). The location-enabled device can determine that it is outside of the problematic area in a number of ways. In one embodiment, the reliability measure of the primary location technology can return to a predetermined threshold level, where the threshold level represents an acceptable accuracy. In some embodiments, the combined location data (e.g., combined primary and sensor location data) can indicate a location that is outside of the known problematic area. In some embodiments, the location-enabled device can determine that the primary location technology can be trusted by comparing the primary location technology location fix to another location technology fix. For example, the device can determine it is outside of the problematic area for the primary location technology (e.g., GPS) by determining a reliable location fix with a second location technology (e.g., cellular or WiFi location, time of flight calculations, etc.).

At block 370, the location-enabled device can switch out of estimation mode and return to the standard mode of operation. For example, the location-enabled device may determine its location solely based on the primary location technology since the location fixes are trusted and reliable.

In some embodiments, one or more sensor or location estimation processes may be turned off and/or stopped to conserve resources until another problematic area is encountered. For example, the accelerometer may be powered off or not monitored and/or a relative distance/bearing calculation module may cease calculating to conserve resources.

One or more of the process blocks of the methods described in the present disclosure may be optional and may be omitted. The sequence of one or more process blocks may be modified, and the process blocks may be performed in any suitable order. Some of the optional blocks and/or sequence modifications are specifically described herein for purposes of illustration; however, one having skill in the art will recognize that other modifications and omissions are contemplated within the scope of the disclosure.

Figure 4:
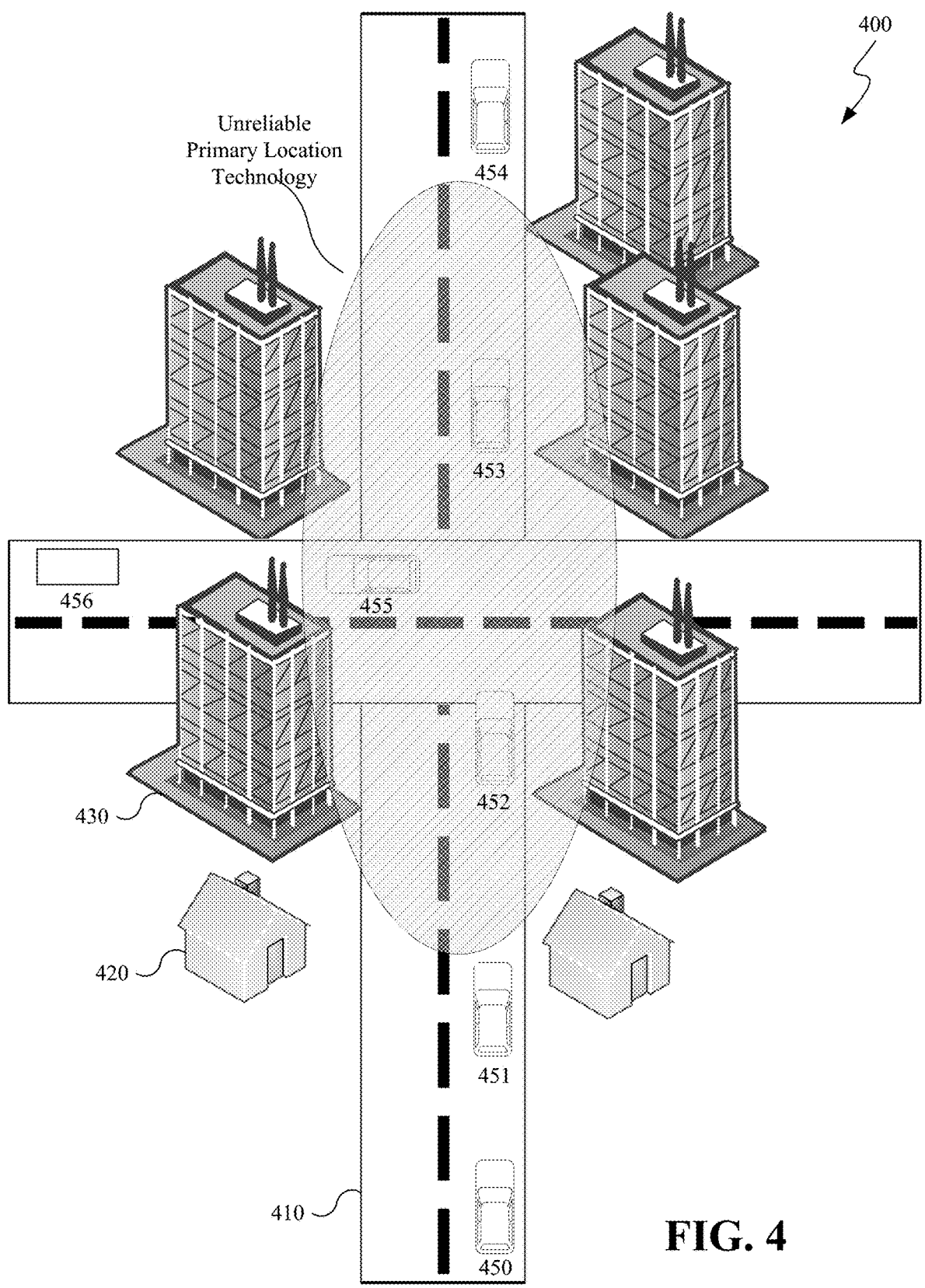
FIG. 4 is a block diagram of a vehicle in and around an "urban canyon" according to an embodiment of the present invention.

FIG. 4 is a block diagram of a vehicle in and around an "urban canyon" (or other area with unreliable location signals) according to an embodiment of the present invention. System 400 includes a road 410, small structures 420, large structures 430, and a vehicle (e.g., vehicle 251) illustrated in various positions (450-456). A mobile device (e.g., 201) may be inside of the vehicle. Although FIG. 4 illustrates a car moving through an area with unreliable location signals, the same concepts could apply to a person in another type of vehicle or a person walking through an urban canyon or similar problematic area where a primary location technology is unreliable.

When the vehicle is at position 450, the location of the vehicle (or mobile device in the vehicle) can be determined location using a primary location technology, such as GPS, cellular, WiFi, and/or time of flight location technologies. At position 450, the vehicle and/or mobile device can receive a reliable location signal from the primary location technology. Position 450 could, for example, correspond to block 310 (FIG. 3) when a current location is determined using the primary location technology.

Subsequently, the vehicle and/or mobile device can move to position 451. The location at position 451 can be determined using the primary location technology (e.g., block 310 in FIG. 3) or using an estimation mode. Although the vehicle and/or mobile device are near relatively small structure 420, the primary location technology may still have a threshold reliability such that the location data provided is trusted. It is also possible that the reliability measure approaches the reliability threshold at position 451. In some embodiments, the vehicle and/or mobile device can identify an area with unreliable location signals based on the decreasing measure of reliability (e.g., step 320 in FIG. 3). In some embodiments, the vehicle and/or the mobile device can identify an area with unreliable location signals based on knowledge of known areas with unreliable location data and a determined location near that known area. For example, at position 450 (or position 451), the vehicle and/or mobile device may recognize that it is approaching a known area with unreliable location signals.

As the vehicle and/or mobile device move further down the road 410, larger structures 420 may be encountered, for example at position 452. Large structure 430 may obstruct one or more location signals. If at position 452, only the primary location technology was used, it is possible that the location data would be inaccurate and may have a high margin of error. In some embodiments, the precise location of the vehicle and/or mobile device at an area with unreliable location signals can be critical. For example, a right turn or a left turn may be made at the intersection. The primary location technology may not be able to determine reliably whether the vehicle and/or mobile device has turned or continued straight down the road. For example, along one hypothetical route the vehicle may have moved from position 452 to 453 to 454. Along another hypothetical route the vehicle may have moved from position 452 to 455 to 456. As illustrated in FIG. 4, however, an urban canyon may prevent reliable location determinations by the primary location technology at positions 452, 453, and/or 455. Therefore, in some embodiments, a more reliable location can be calculated by switching to estimation mode when a problematic area is identified (e.g., block 330 in FIG. 3).

First Travel Path Example.

In one example, the vehicle and/or mobile device switches to an estimation mode at position 451. Sensor data is measured, and a distance and direction is calculated from a last known reliable location (e.g., position 451). In some embodiments, the vehicle and/or mobile device can determine that it is located at position 452 by supplementing primary location data with sensor data. For example, location coordinates at position 451 (e.g., latitude and longitude coordinates) may be reliable. Sensor data can be used to calculate a distance (e.g., 25 meters) and a direction (0 degrees). Therefore, 25 meters at 0 degrees can be added to the location coordinates determined at position 451.

Still in estimation mode, the vehicle and/or mobile device may continue straight through the intersection. In some embodiments, the vehicle and/or mobile device can determine that it is located at position 453 by supplementing primary location data with sensor data (e.g., by adding the distance and direction traveled from position 452). Still in estimation mode, the vehicle and/or mobile device may continue down the road. At position 454, the device can determine that it has exited from a problematic area (e.g., block 360 in FIG. 6). Responsive to detecting an exit from a problematic area, the device may switch back to the primary location technology (e.g., block 370 in FIG. 3).

Second Travel Path Example.

In a second example, the vehicle and/or mobile devices switch to an estimation mode at position 452, where the primary location technology is unreliable. The locating-enabled device can reference its last known reliable location and supplement that last known reliable location with sensor data (i.e., add relative distance and direction traveled since position 451). Now in estimation mode, the vehicle and/or mobile device senses a turn (e.g., with the compass, gyro, accelerometers, etc.). The vehicle can move to position 455 and this position can be calculated using the last known location (e.g., position 451) as supplemented by the relative movement from that position. Still in estimation mode, the vehicle and/or mobile device may continue down the road. At position 456, the device can determine that it has exited from a problematic area (e.g., block 360 in FIG. 6). Responsive to detecting an exit from a problematic area, the device may switch back to the primary location technology (e.g., block 370 in FIG. 3).

If the vehicle and/or mobile device relied solely on primary location technology in the problematic area, it might be difficult or impossible to determine whether the vehicle and/or mobile device turned, stopped, or went straight. For example, only relying on the primary location technology, the vehicle and/or mobile device might not be able to differentiate between the first travel path example and the second travel path example. Only upon exiting the problematic area would the vehicle and/or mobile device be able to confidently determine that it was in position 454 or position 456. The intermediate positions 452, 453, and 455 may not be able to be determined accurately with primary location technology alone.

III. Improving Location Performance with Sensor Input

The accuracy of location can be improved using sensor input. In some embodiments, sensor data can be used to identify and correct errors in the primary location technology. In some embodiments, sensor data can be used to identify areas with unreliable location signals. In some embodiments, sensor data can be used to modify the sampling interval at which the primary location technology determines location, which can conserve battery life and increase location accuracy during critical periods.

Figure 5:
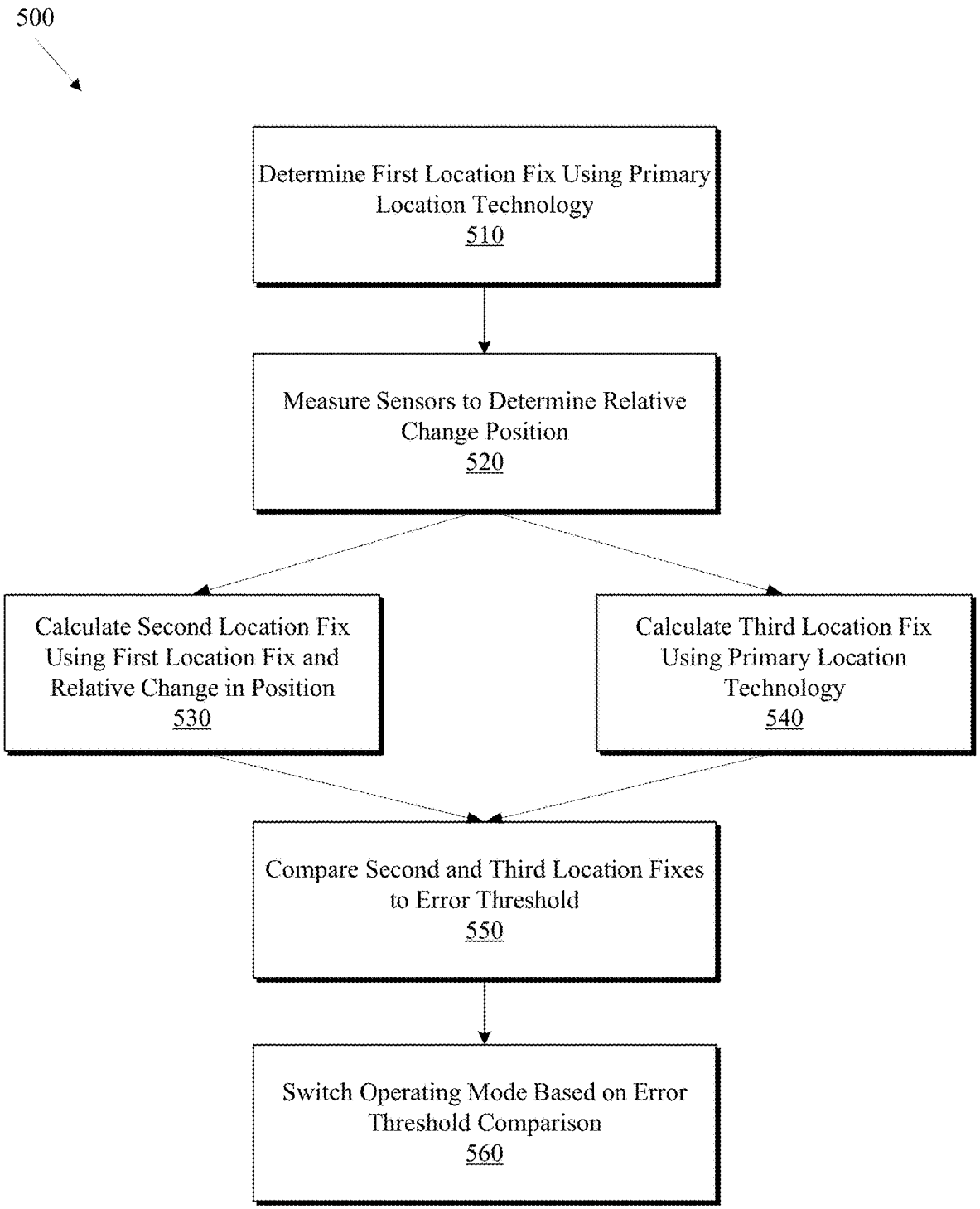
FIG. 5 is a flow diagram of a process to obtain a more accurate location fix according to an embodiment of the present invention.

FIG. 5 illustrates a method 500 of changing the operating mode of a location-enabled device using sensor data. At block 510, a location-enabled device can determine a first location fix using a primary location technology at a first time. The primary location technology can return location information in absolute terms. For example, a mobile device might determine geographical coordinates (e.g., latitude and longitude coordinates) at a time $T_1$. Any suitable location technology can be used.

At block 520, sensors can be measured and recorded to determine relative distance and direction changes from the first time to a second time. For example, an accelerometer, gyroscope, and/or compass can be used to calculate a relative distance and direction traveled between $T_1$ and $T_2$.

At block 530, a second location fix can be calculated based on the first location fix and the relative change in position calculated at block 520. At block 540, a third location fix can be calculated using the primary location technology. In some embodiments, the second location fix and the third location fix are determined substantially simultaneously at the second time $T_2$. For example, the second location fix represents one estimation of the position at the second time (e.g., $T_2$), and the third location fix represents another calculation of the position at the same time (i.e., $T_2$).

At block 550, a difference between the second location fix and the third location fix can be calculated. In some embodiments, the difference is compared to a threshold error. In some embodiments, if the threshold is exceeded at least one of the second and third location fixes is considered unreliable.

At block 560, the location-enabled device may change a mode of operation based on whether the error threshold is exceeded or not. In some embodiments, the location-enabled device may switch to an estimation mode when the error threshold for the primary location technology is exceeded. In some embodiments, the sampling interval of the primary location technology may be modified.

In some embodiments, a sensor-assisted location fix (e.g., the second location fix determined at block 530) and a primary location technology fix calculated at substantially the same time (e.g., the third location fix determined at block 540) can be continuously and periodically compared with each other. If the sensor-assisted location fix and the primary location technology fix calculated at substantially the same time are within a threshold range, the location-enabled device can rely on its primary location technology data. If an error threshold is exceeded, the location-enabled device can enter an estimation mode, as described above. In some embodiments, as the difference between the sensor-assisted location fix and the primary location technology fix grows, the primary location technology fix may be trusted less; as the difference between the sensor-assisted location fix and the primary location technology fix decreases, the primary location technology fix can be trusted more.

In some embodiments, if the difference is below the threshold error, the third location fix can be trusted. In some embodiments, if the difference is above the threshold error, the second location fix can be trusted and/or the third location fix can be untrusted. In some embodiments, the second and third location fixes can be averaged and/or weighted according to level of reliability to arrive at an estimated location fix based on both the second and third location fixes. The trusted location, whether calculated using the primary location technology or a hybrid method, may be displayed on a user interface of the location-enabled device. For example, as a location indicator dot can be displayed in a maps application.

In some embodiments, the location of the inaccurate third location fix (as determined by the primary location technology) can be marked as untrusted using the second location fix (as determined using the first location fix and the relative change in position). That is, a record of the fact that the primary location technology produced inaccurate coordinate may be created. The record may be transmitted to a remote server computer for analysis (e.g., such as crowd-sourcing, discussed below).

In some embodiments, the primary location technology can be GPS. In some embodiments, if the difference between the second location fix and the third location fix is within the threshold error, a sampling rate of the GPS may be reduced. That is, a GPS-enabled device may typically determine location at a specified interval (e.g., once per second, etc.). When the difference is less than a threshold error, it may indicate that both location technologies are determining location with a desired level of accuracy. In this circumstance, it may be beneficial to reduce the sampling rate of GPS to conserve power resources. This concept could also apply to other primary location technologies in order to extend battery life.

In some embodiments, if the difference between the second location fix and the third location fix is not within the threshold of error, a sampling rate of the GPS may be increased. When the difference is greater than a threshold error, it can indicate that either the second location fix or the third location is inaccurate. In this circumstance, it may be beneficial to increase the sample rate of the GPS to more aggressively correct for errors. While this may use more power, it provides a faster correction of inaccurate location.

In some embodiments, various locations can be marked as trusted or untrusted. These may be stored in a record on the location-enabled device. In some embodiments, a set of one or more untrusted locations can be transmitted to a remote server computer. The server can include a database for storing a plurality of untrusted locations transmitted by a plurality of mobile devices and a processor for analyzing the records for statistical significance.

Figure 6:
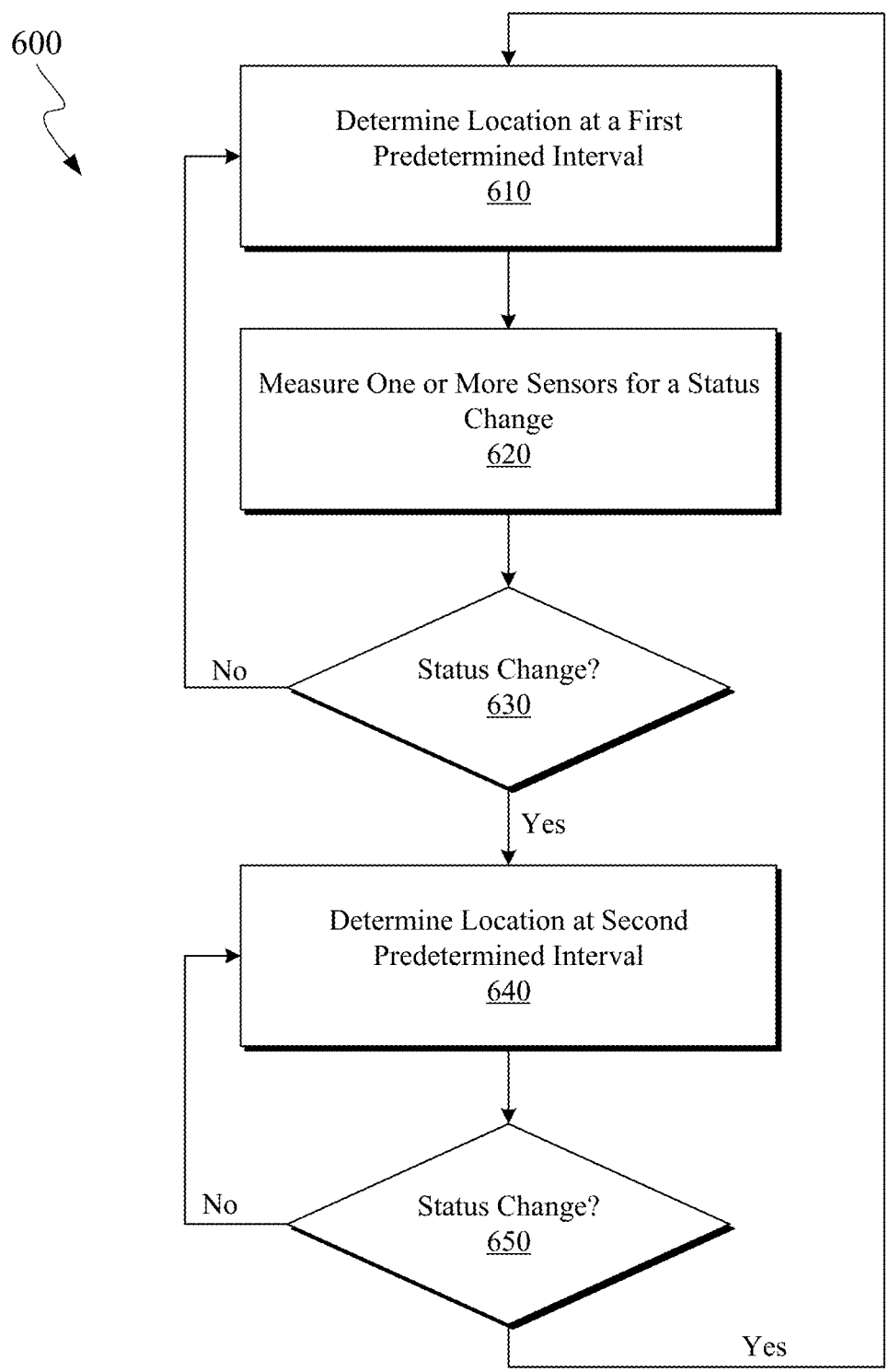
FIG. 6 is a flow diagram of a process to obtain a more accurate location fix according to an embodiment of the present invention.

FIG. 6 illustrates a method 600 for modifying the sampling interval of a location technology, such as GPS, in accordance with an embodiment of the present invention. Method 600 can be used for power management and increasing battery life. Method 600 can also be used to increase the performance and accuracy of location fixes by determining location at an increased rate at or near critical time periods, where more accurate location information may be desired.

At block 610, location may be determined at a first predetermined interval using a location technology. For example, the location technology can be GPS, and the predetermined sampling interval can be 1 second (or any suitable sampling interval). The first predetermined sampling interval may be set based on factors, such as desired accuracy, power management, and the like. A more aggressive sampling interval (e.g., a smaller amount of time between location samples or getting location data more frequently) is typically more accurate; however, this may also use more power. More aggressive sampling intervals can be useful when the rate of change in location (e.g., speed) is greater. For example, a more aggressive sampling interval can be useful when a location-enabled device is moving fast (e.g., driving), and a more conservative sampling interval can be useful when the device is moving slow (e.g., walking).

At block 620, sensors can be monitored for a status change. A "status change" is a change in the movement and/or direction of the location-enabled device. A status change can be used to identify potential critical time periods where it may be beneficial to increase or decrease the location data sampling rate.

In some embodiments, a status change can be a change in speed or acceleration. For example, a location-enabled device can be traveling at 45 mph with no acceleration (i.e., 0 f/s/s). A status change in this example could be a deceleration to 30 mph. This may indicate that a car is slowing to make a turn. In another example, a status change could be a change from a walking speed to a driving speed. Location data likely would not need to be updated as frequently for a walking person as compared to a driving person.

In some embodiments, a status chance can be starting from a stop, or conversely, slowing from a positive speed to a stop. In some embodiments, a status change can be a change in the direction of the movement of a location-enabled device (e.g., turning). Status change can help identify a critical event where it may be beneficial to increase the sampling rate of the location technology. Likewise, lack of status changes can be used to decrease the sampling rate with minimized reduction of location data accuracy.

In some embodiments, a status change can be an upcoming direction instruction from a navigation or map app. For example, a navigation app can provide a series of directions to get from Point A to Point B (e.g., drive 25 miles down I-280; exit CA-85). As the location-enabled device moves along highway I-208 and approaches the CA-85 exit, this may indicate a status change. Since the navigation app instructed an exit event, this may be a critical point for location accuracy and the location sampling may be increased. Likewise, location sampling may be decreased when the upcoming direction is far off (e.g., 25 miles away) and the location-enabled device is moving along the recommended travel route (e.g., I-280).

Any suitable device sensor can be used to detect a status change, including motion sensors (e.g., accelerometer), orientation sensors (e.g., gyrometer), and/or direction sensors (e.g., compass). The sensor can be included on a mobile device (e.g., mobile device 201) and/or a vehicle (e.g., vehicle 251). In some embodiments, sensor data can be communicated between the mobile device and the vehicle. For example, vehicle could send speedometer/odometer data to the mobile device. In another example, the vehicle could communicate a turn indication to the mobile device (e.g., vehicle system could detect a turn of the steering wheel and/or a turn signal activation).

At block 630, the location-enabled device can monitor the sensor data from one or more sensors to determine whether a status change has occurred. If there is no status change, the process can return to block 610. That is, there is no change in the location data sampling interval and the sensor can be continuously or periodically monitored. If a status change is detected, the process can continue to block 640.

At block 640, location data is sampled at a second predetermined interval. The second predetermined interval is different than the first predetermined interval. In some embodiments, the second sampling interval is smaller than the first sampling interval. In some embodiments, the second sampling interval is larger than the first sampling interval.

At block 650, the location-enabled device can monitor the sensor data from one or more sensors to determine whether a status change has occurred. In some embodiments, a status change can be an expiration of a predetermined amount of time since the status change detected at block 630 (e.g., a timeout period). If there is no status change, the process can return to block 640. That is, there is no change in the location data sampling interval and the sensor can be continuously or periodically monitored. If a status change is detected, the process can return to block 610 in some embodiments. In some embodiments, if a status change is detected at block 660, the process can determine location at a third predetermined interval that is different from the first and second predetermined intervals (not shown).

Now that a high-level description of method 600 has been described, an example application of method 600 will be described. A location service, such as a maps app, may be used on a mobile device for turn-by-turn driving directions from an origin to a destination. The maps app may rely on GPS to obtain location data. Before a vehicle that the mobile device is inside of starts moving, the mobile device may sample GPS signals and calculate a location at a first predetermined interval (e.g., once every 30 seconds). This conserves battery life when the mobile device is relatively certain, based on sensor data, that the device location has not changed. When the mobile device detects movement (e.g., the vehicle accelerating to a driving speed), the sampling interval may be changed to a second predetermined interval (e.g., once every 2 seconds). This sampling interval may continue until a status change. A second status change can be detected by the mobile device. The second status change, for example, could be a change in direction consistent with a turn of the vehicle (or a signal from the vehicle system indicating a turn). In order to update a display with a position marker (e.g., a user interface of the maps app), the sampling interval may be changed to a third predetermined sampling interval (e.g., once every 0.5 seconds). This sampling interval could be even more aggressive than the second interval (used when the vehicle is driving) so that the maps app can more accurately display the change in position that occurs while the vehicle is turning. This example is for illustration only and one having skill in the art will recognize that other applications are contemplated.

Figure 7:
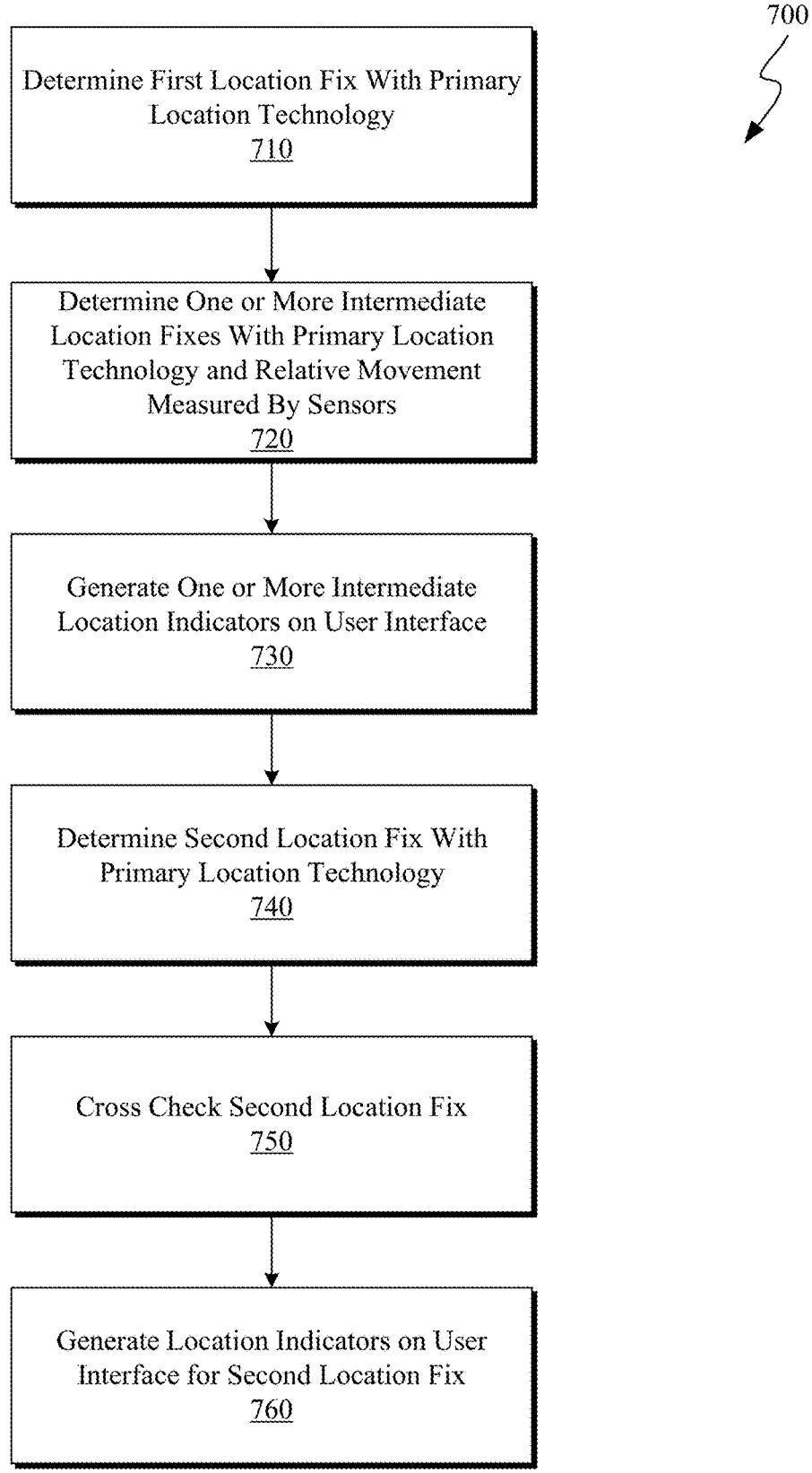
FIG. 7 is a flow diagram of a process to obtain a more accurate location fix according to an embodiment of the present invention.

FIG. 7 illustrates a method 700 of determining intermediate location fixes with sensor data between location data samples from a primary location technology according to an embodiment of the present invention. Location services may visually display the current location of a device in a user interface to illustrate the real-time position of the device on a display. A location indicator may signify the current location on a mobile device. For example, on an iPhone, the current location can be signified by a blue dot.

Typically, a mobile device determines its location using a primary location technology at a predetermined interval. It is possible that the mobile device moves between location data samples. If the user interface merely updates the location indictor each time the location data is sampled, the location indicator may appear to "jump" from one location fix to the next location fix (rather than smoothly along continuous curve). Therefore, software modules can take two location data samples and connect them so that the motion appears smooth on a user interface with a location indicator. The location indicators may be connected along a continuous path based on various assumptions and/or known information about the travel area. Software modules can also anticipate a next location based on a previous location.

For example, if a mobile device is moving along a path defined by a road at a significant rate of speed, the mobile device may predict that the next location will be on the same road and an estimated distance further down the road in the same direction of travel. This prediction can be used by the mobile device to display a smooth and continuous motion of the location indicator on the user interface (e.g., the location dot moves smoothly and does not "jump" from one location to the next location each time a new location data sample is taken). Another example can rely on directions provided by a map or navigation app. That is, if a navigation app provides directions to turn or continue on the same road, at approximately the point of the turn (or "continue straight") direction, the device may assume that the direction will be followed. In this instance, even though the device may not poll its location using primary location technology, it may draw the location indicator on the display according to the assumption that the navigation directions will be followed by the user. However, predictions about the location of the device between location data samples taken by the primary location technology can be incorrect. Therefore, it can be desirable to rely on sensor data between location data samples from the primary location technology.

At block 710, a location-enabled device can determine its location using a primary location technology, such as GPS. The primary location technology has a sampling interval that it uses to obtain location data samples. A location indicator can be generated for the first location fix and displayed on the location-enabled device. For example, a location dot representing the location data obtained by GPS can be displayed on a maps application user interface.

At block 720, intermediate location fixes can be determined using the primary location technology combined with a relative change in position as measured by sensors. For example, one or more sensors (e.g., accelerometer, compass, gyrometer, etc.) can be used to calculate a relative change in position form the first location fix.

At block 730, intermediate location indicators can be generated for the intermediate location fixes. These intermediate location indicators can be displayed on the user interface. Intermediate location fixes can be used to display a smooth motion of the movement of the location indicator between location data samples generated by the primary location technology.

At block 740, a second location fix can be determined with the primary location technology. That is, after the predetermined sampling period has passed, another location data sample is taken using the primary location technology.

In some embodiments, at block 750, the location fix may be cross checked against one of the intermediate location fixes to determine if they are consistent. For example, the last intermediate location fix should be relatively close to the second location fix using the primary location technology if the sensor data is accurately calculating the relative change in position. This step is optional and may be omitted. If the locations are not within a threshold range, the location can be marked as having unreliable location data for that particular location technology.

At block 760, a location indicator for the second location indicator can be generated and displayed on the user interface. In this way, changes in position of the location-enabled device between sample periods can be accurately estimated and displayed on a user interface without having to rely solely on assumptions about the direction and speed of travel.

IV. Crowd-Sourcing Weak GPS Locations

Figure 8:
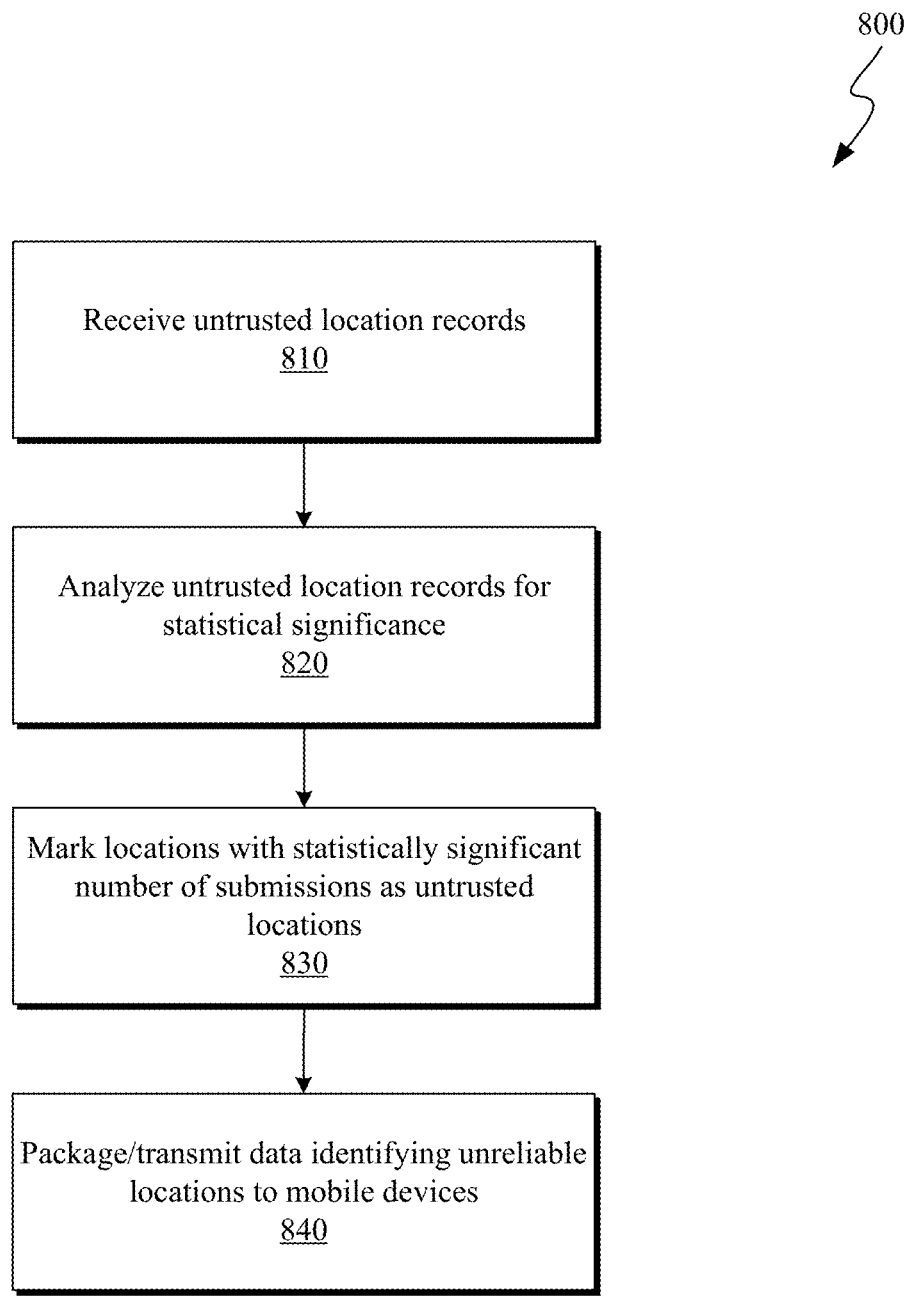
FIG. 8 is a flow diagram of a process to crowd-source untrusted locations according to an embodiment of the present invention.

Location-enabled devices can identify areas with unreliable location data for a particular location technology. For example, a mobile device can determine an area that has weak GPS due to an urban canyon. Devices can make a record of these areas. FIG. 8 illustrates a method of crowd-sourcing records of areas having untrusted location data from a plurality of mobile devices.

At step 810, records of areas having untrusted locations are received from mobile devices. Preferably the number of devices submitting this information is large so that sufficient data can be collected and analyzed.

At step 820, a server computer can analyze the numerous records and determine whether a particular area has a statistically significant number of submissions indicating that the location has unreliable location data (e.g., unreliable GPS).

At step 830, if a threshold number of submissions has been received for a particular location, the server computer may mark the location as having unreliable location data. A map or database of areas with unreliable GPS data can be generated and populated based on the submissions.

At step 840, the server computer can package and transmit data identifying unreliable locations to various mobile devices for their use. For example, the server computer could package data identifying all the known areas with unreliable location data within a predetermined radius (e.g., 1 km) of the location of the mobile device. the mobile device can use this data to switch into an estimation mode, as described in FIG. 3, for example.

V. Location-Enabled Device

Figure 9:
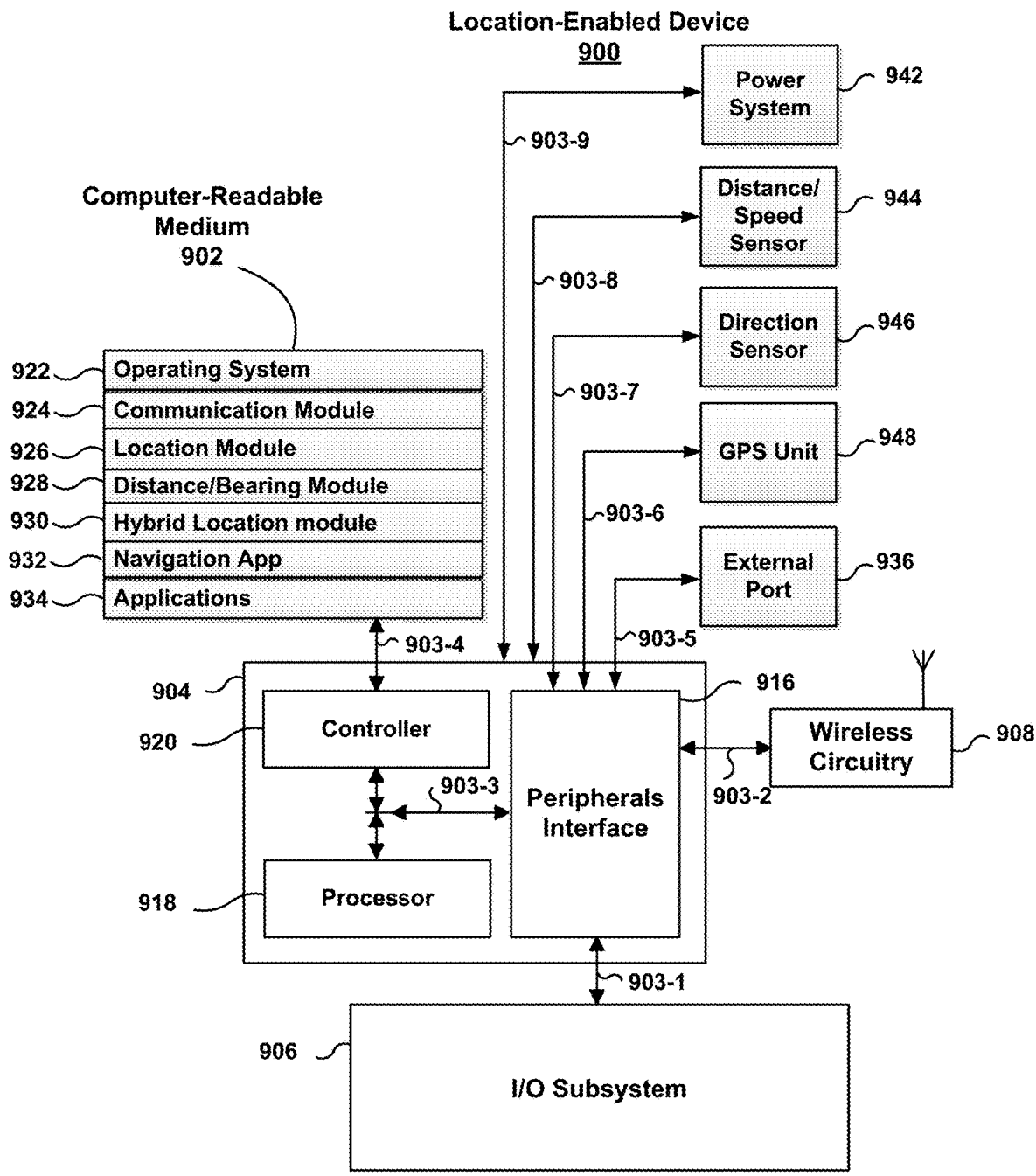
FIG. 9 illustrates a mobile device that can be used according to an embodiment of the present invention.

FIG. 9 is a block diagram of a location-enabled device 900 according to an embodiment of the invention. In some embodiments, location-enabled device 900 can be a mobile device (e.g., 201 in FIG. 1). In some embodiments, location-enabled device 900 can be part of a vehicle system (e.g., 251 in FIG. 2). In some embodiments, location-enabled device 900 can reside partially on mobile device 201 and partially on vehicle 251, and mobile device 201 and vehicle 251 can be in operative communication with each other.

Location-enabled device 900 generally includes computer-readable medium 902, a processing system 904, an Input/Output (I/O) subsystem 906, and wireless circuitry 908. These components may be coupled by one or more communication buses or signal lines 903. Device 900 can be any portable electronic device, including a handheld computer, a tablet computer, a mobile phone, laptop computer, tablet device, media player, personal digital assistant (PDA), portable GPS navigation unit, built-in car navigation system, other car computer system, a key fob, a car key, an access card, a multi-function device, a mobile phone, a portable gaming device, or the like, including a combination of two or more of these items.

It should be apparent that the architecture shown in FIG. 9 is only one example of an architecture for location-enabled device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A location-enabled device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 916, one or more processors 918, and memory controller 920 can be implemented on a single chip, such as processing system 904. In some other embodiments, they can be implemented on separate chips.

Location-enabled device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power.

In some embodiments, location-enabled device 900 includes various sensors, such as distance and speed sensors 944 and direction and orientation sensors 946. Sensors can include one or more of the accelerometers, compasses, gyrometers, speedometers, odometers, and the like for detecting direction and magnitude of movement.

In some embodiments, location-enabled device 900 can include a GPS receiver, sometimes referred to as a GPS unit 948. A location-enabled device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the location-enabled device. Based on these estimations, the location-enabled device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a distance/bearing module (or set of instructions) 928, a hybrid location module (or set of instructions) 930, one or more navigation applications (or set of instructions) 932, and other applications (or set of instructions) 934.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

Location module 926 can assist in determining the current position (e.g., coordinates or other geographic location identifier) of location-enabled device 900. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location module 926 receives data from GPS unit 948 and analyzes the signals to determine the current position of the location-enabled device. In some embodiments, location module 926 can determine a current location using WiFi or cellular location technology. For example, the location of the location-enabled device can be estimated using knowledge of nearby cell sites and/or WiFi access points with knowledge also of their locations. Information identifying the WiFi or cellular transmitter is received at wireless circuitry 908 and is passed to location module 926. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for location-enabled device 900 based at least in part on the position coordinates of the corresponding transmitters. Regardless of the specific location technology used, location module 926 receives information from which a location fix can be derived, interprets that information, and returns location information, such as geographic coordinates, latitude/longitude, or other location fix data.

Distance/bearing module (or set of instructions) 928 can take various inputs from location-enabled device sensors and determine distance and/or bearing information based on the sensors. For example, sensors can include an accelerometer and a compass in some embodiments. Based on acceleration and direction values from the accelerometer and the compass, the distance/bearing module may determine a distance traveled and a direction from a known location (e.g., as determined by the location module 926). The distance and direction information can be used, for example, in supplementing GPS location data in a weak location signal scenario.

Hybrid location module (or set of instructions) 930 can take input from a primary location technology, such as GPS, and combine it with sensor data representing a change in relative position. The combined location data and sensor data can be used to calculate a location.

Navigation app (or set of instructions) 932 may be an application running on the location-enabled device to assist the user in navigation (e.g., turn-by-turn directions or the like).

The one or more applications 934 on the location-enabled device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include increased accuracy of the location fixes using hybrid location technology. Power consumption and battery life may also be improved in certain embodiments of the present invention. The visual display of a location indicator can also be improved to more accurately reflect the position of a location-enabled device in real-time and in between location data sampling intervals. For example, sensor data can be used to smooth out the curve of a turn, as displayed on a navigation app user interface. Further advantages to certain embodiments of the invention include locating and recording areas having unreliable primary location data.

In some embodiments, some or all of the operations described herein can be performed using an application executing on the user's location-enabled device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer-readable storage media; suitable media include magnetic disk or tape, optical storage media such as compact disk (CD) or DVD (digital versatile disk), flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method of determining location, the method comprising:
   determining, with a computing device, a location of the computing device using a first location technology mode, wherein the first location technology mode is global positioning satellite (GPS) technology;
   detecting a status change with one or more sensors indicating that the computing device is entering a location with weak or untrusted GPS technology information; and
   responsive to detecting the status change, determining the location of the computing device using a second location technology mode, wherein the second location technology mode is an estimation technology based on sensor data directed to distance and direction traveled.

2. The method of claim 1, wherein the first location technology mode polls location at a first sampling interval.

3. The method of claim 2, wherein the second location technology mode polls location at second sampling interval.

4. The method of claim 3, wherein the second sample interval is smaller than the first sampling interval.

5. The method of claim 1, wherein the one or more sensors comprise one or more of the following: an accelerometer, a gyrometer, a compass.

6. The method of claim 5, wherein the second location technology mode calculates location using the direction or distance traveled as measured by the one or more sensors.

7. The method according to claim 1, further comprising:
   calculating a first location fix at a first time;
   calculating a distance and direction traveled from the first location fix using the one or more sensors; and
   combining the distance traveled with the first location fix to obtain a second location fix at a second time.

8. The method according to claim 1, further comprising:
   obtaining, with the computing device, a first set of global position satellite signals and calculating a first location fix at a first time;
   combining a distance traveled with the first location fix to obtain a second location fix at a second time;
   obtaining, with the computing device, a second set of global position satellite signals and calculating a third location fix at approximately the second time;
   determining a difference between the second location fix and the third location fix; and
   comparing the difference to a threshold error.

9. The method of claim 1, wherein the status change comprises a change in the direction or magnitude of sensor data measured by the one or more sensors above a predetermined threshold.

10. The method of claim 1, wherein the status change is a detected movement, turn event, stop event, speed change event, or directions event.

11. The method of claim 8, further comprising: in response to the difference being above the threshold error, determining that the computing device is entering the location with weak or untrusted GPS technology information.

12. The method of claim 1, wherein the detecting the status change with the one or more sensors indicating that the computing device is entering the location with weak or untrusted GPS technology information comprises detecting with the one or more sensors a status change in a sampling interval of sensor measurements of the one or more sensors.

13. A non-transitory computer readable medium having instructions stored thereon, which, when executed by one or more processors of a computing device, cause the computing device to perform operations comprising:
   determining, with the computing device, a location of the computing device using a first location technology mode, wherein the first location technology mode is global positioning satellite (GPS) technology;
   detecting a status change with one or more sensors indicating that the computing device is entering a location with weak or untrusted GPS technology information; and
   responsive to detecting the status change, determining the location of the computing device using a second location technology mode, wherein the second location technology mode is an estimation technology based on sensor data directed to distance and direction traveled.

14. The computer readable medium of claim 13, wherein the first location technology mode polls location at a first sampling interval.

15. The computer readable medium of claim 14, wherein the second location technology mode polls location at second sampling interval.

16. The computer readable medium of claim 15, wherein the second sample interval is smaller than the first sampling interval.

17. The computer readable medium of claim 13, wherein the one or more sensors comprise one or more of the following: an accelerometer, a gyrometer, a compass.

18. The computer readable medium of claim 17, wherein the second location technology mode calculates location using the direction or distance traveled as measured by the one or more sensors.

19. The computer readable medium of claim 13, further comprising instructions that cause the one or more processors to perform:
   calculating a first location fix at a first time;
   calculating a distance and direction traveled from the first location fix using the one or more sensors; and
   combining the distance traveled with the first location fix to obtain a second location fix at a second time.

20. The computer readable medium of claim 13, further comprising instructions that cause the one or more processors to perform:
   obtaining, with the computing device, a first set of global position satellite signals and calculating a first location fix at a first time;
   combining a distance traveled with the first location fix to obtain a second location fix at a second time;
   obtaining, with the computing device, a second set of global position satellite signals and calculating a third location fix at approximately the second time;
   determining a difference between the second location fix and the third location fix; and
   comparing the difference to a threshold error.

21. The computer readable medium of claim 13, wherein a status change comprises a change in the direction or magnitude of sensor data measured by the one or more sensors above a predetermined threshold.

22. The computer readable medium of claim 13, wherein the status change is a detected movement, turn event, stop event, speed change event, or directions event.

* * * * *